United States Patent
Miyamoto et al.

(10) Patent No.: US 9,963,579 B2
(45) Date of Patent: May 8, 2018

(54) THERMOPLASTIC RESIN MOULDED ARTICLE, AND PRODUCTION METHOD FOR THERMOPLASTIC RESIN MOULDED ARTICLE

(71) Applicant: MAZDA MOTOR CORPORATION, Hiroshima (JP)

(72) Inventors: Tsuguhisa Miyamoto, Hiroshima (JP); Chiaki Asano, Kure (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 67 days.

(21) Appl. No.: 14/895,773

(22) PCT Filed: May 19, 2014

(86) PCT No.: PCT/JP2014/002616
§ 371 (c)(1),
(2) Date: Dec. 3, 2015

(87) PCT Pub. No.: WO2014/196133
PCT Pub. Date: Dec. 11, 2014

(65) Prior Publication Data
US 2016/0122513 A1    May 5, 2016

(30) Foreign Application Priority Data

Jun. 7, 2013 (JP) .................................. 2013-120489

(51) Int. Cl.
*H01B 1/06* (2006.01)
*C08K 9/02* (2006.01)
(Continued)

(52) U.S. Cl.
CPC ............ *C08K 9/02* (2013.01); *B29C 45/0001* (2013.01); *B29C 45/0005* (2013.01); *C08K 7/06* (2013.01);
(Continued)

(58) Field of Classification Search
CPC ........... C08L 53/00; C08L 23/14; C08L 23/10
(Continued)

(56) References Cited

U.S. PATENT DOCUMENTS

2009/0143524 A1   6/2009  Nakayama et al.
2011/0263778 A1*  10/2011 Honma .................. C08L 23/10
                                                        524/495
2012/0238688 A1   9/2012  Iwashita et al.

FOREIGN PATENT DOCUMENTS

JP    S61-037823 A    2/1986
JP    H02-269868 A    11/1990
(Continued)

OTHER PUBLICATIONS

International Search Report and Written Opinion issued in Application No. PCT/JP2014/002616, dated Jul. 29, 2104.

*Primary Examiner* — Khanh Tuan Nguyen
(74) *Attorney, Agent, or Firm* — Studebaker & Brackett PC (57) ABSTRACT

A thermoplastic resin molding according to the present invention contains carbon fibers. An amount of the carbon fibers falls within a range from 0.4 mass % to 10 mass %. An average length of the carbon fibers falls within a range from 0.5 mm to 15 mm. The thermoplastic resin is polypropylene. The polypropylene includes polypropylene containing at least one of a carboxyl group, a carbonyl group, or a hydroxyl group. Surfaces of the carbon fibers contain at least one of a carboxyl group, a carbonyl group, a hydroxyl group, or a Cl group.

18 Claims, 7 Drawing Sheets (51) Int. Cl.
    *C08K 7/06*         (2006.01)
    *B29C 45/00*      (2006.01)
    *C08L 53/00*      (2006.01)
    *B29K 23/00*      (2006.01)
    *B29K 105/12*     (2006.01)
    *B29K 307/04*     (2006.01)

(52) U.S. Cl.
    CPC ........ *C08L 53/005* (2013.01); *B29K 2023/12* (2013.01); *B29K 2105/12* (2013.01); *B29K 2307/04* (2013.01); *C08L 2201/08* (2013.01); *C08L 2205/03* (2013.01)

(58) Field of Classification Search
    USPC ................ 524/495, 504; 264/328.1; 252/511
    See application file for complete search history.

(56) References Cited

FOREIGN PATENT DOCUMENTS

| | | | |
|---|---|---|---|
| JP | H04-318041 A | | 11/1992 |
| JP | 2000-218711 A | | 8/2000 |
| JP | 2006-225468 | * 8/2006 | ............. C08L 23/20 |
| JP | 2010-248482 A | | 11/2010 |
| JP | 2010-248483 A | | 11/2010 |
| JP | 2012-116916 A | | 6/2012 |
| JP | 2012-158648 A | | 8/2012 |
| JP | 2012-167250 A | | 9/2012 |
| WO | 2007/037260 A1 | | 4/2007 |
| WO | 2011/030544 A1 | | 3/2011 |

\* cited by examiner

THERMOPLASTIC RESIN MOULDED ARTICLE, AND PRODUCTION METHOD FOR THERMOPLASTIC RESIN MOULDED ARTICLE

TECHNICAL FIELD

The present invention relates to thermoplastic resin moldings and methods of forming thermoplastic resin moldings, and more particularly to thermoplastic resin moldings containing carbon fibers and methods of forming thermoplastic resin moldings containing carbon fibers.

BACKGROUND ART

In recent years, with rapid spread of electronic devices, housings or the like for, for example, personal computers, mobile phones, and automobile parts have been required to have a conductive function and shield electromagnetic waves to reduce malfunctions of electronic devices and influence on human bodies, etc. Easily moldable thermoplastic resin moldings are increasingly used for IC trays for carrying IC packages. In order to protect ICs from static electricity, thermoplastic resin IC trays need to have electric conductivity and an antistatic function.

Various techniques of sensing distances, speeds, and obstacles using electromagnetic waves are employed. Such cases require shielding of unnecessary electromagnetic waves to perform accurate sensing.

Using conductive resin is one of the methods of making a thermoplastic resin molding conductive to shield electromagnetic waves. However, since conductive resin to be used itself is expensive and impractical, general thermoplastic resin on the market is usually used for a conductive molding. There are roughly two methods of making a general thermoplastic resin molding conductive. One of the methods is to mold thermoplastic resin, and then form a conductive film on the surface of the molding by surface processing such as plating or deposition. The other one is to blend a conductive powder material such as carbon black or metal or a conductive fiber material such as metal fibers or carbon fibers with the thermoplastic resin, and mold the blend.

Out of the two methods, the former of forming the conductive film requires two steps, the molding of the thermoplastic resin, and the surface processing such as plating or deposition. This causes an economical problem in manufacturing. By contrast, the latter of blending the thermoplastic resin with the conductive material requires only one processing, the molding.

A conductive powder or fiber material is blended to thermoplastic resin to make the thermoplastic resin conductive. However, with the same amount, a conductive fiber material has higher conductivity than a conductive powder material. The reason follows. While a conductive function is provided by mutual contact between conductive materials dispersed within thermoplastic resin, conductive fiber materials contact each other more than conductive powder materials. It is thus also understood that a longer conductive fiber material has higher conductivity. As described above, a conductive fiber material may be metal fibers or carbon fibers, for example. Out of them, carbon fibers, particularly long carbon fibers, which have excellent affinity with resin, are particularly preferably used to provide excellent conductivity.

For example, Patent Document 1 discloses a thermoplastic resin molding containing carbon fibers. The amount of the thermoplastic resin in a matrix is 70-99.5 wt %. The total amount of the carbon fibers contained in the molding is 0.5-30 wt %. The content of carbon fibers (a) with lengths greater than 1.5 mm is 0.1-4.7 wt % (with respect to the total amount of the thermoplastic resin and the carbon fibers, the same hereinafter). The content of carbon fibers (b) with lengths of 0.5-1.5 mm is 0.2-10.7 wt %. The content of carbon fibers (c) with lengths smaller than 0.5 mm is 0.2-14.6 wt %. Patent Document 1 teaches that this thermoplastic resin molding provides excellent mechanical characteristics, electric characteristics, and surface appearance, in particular.

CITATION LIST

Patent Document

[PATENT DOCUMENT 1] Japanese Unexamined Patent Publication No. 2000-218711

SUMMARY OF THE INVENTION

Technical Problem

However, the present inventors implemented the technique shown in Patent Document 1, and found that the electromagnetic wave shielding performance differs depending on the orientation of the face of vibration of electromagnetic waves, that is, the shielding performance is different between a horizontally polarized wave and a vertically polarized wave.

The present invention was made in view of the problem, and aims to provide a thermoplastic resin molding that exhibits even shielding performance regardless of the orientation of polarized wave.

Solution to the Problem

In order to solve the problem described above, a thermoplastic resin molding according to the present invention contains carbon fibers. An amount of the carbon fibers falls within a range from 0.4 mass % to 10 mass %. An average length of the carbon fibers falls within a range from 0.5 mm to 15 mm. The thermoplastic resin is polypropylene. The polypropylene includes polypropylene containing at least one of a carboxyl group, a carbonyl group, or a hydroxyl group. Surfaces of the carbon fibers contain at least one of a carboxyl group, a carbonyl group, a hydroxyl group, or a Cl group. Generally, three types of polypropylene exist: a homopolymer, a random copolymer with ethylene, and a block copolymer with ethylene. The block copolymer with ethylene is called "block polypropylene."

This configuration improves the affinity between the carbon fibers containing at least one of the carboxyl group, the carbonyl group, the hydroxyl group, or the Cl group on their surfaces, and the polypropylene containing at least one of the carboxyl group, the carbonyl group, or the hydroxyl group. This allows for even dispersion of the carbon fibers in the polypropylene to exhibit high shielding performance regardless of the orientation of polarized electromagnetic waves incident on the resin molding.

The thermoplastic resin may contain the polypropylene containing at least one of the carboxyl group or the carbonyl group. The surfaces of the carbon fibers may contain at least one of the carboxyl group, the carbonyl group, and the hydroxyl group. The thermoplastic resin may contain resin different from the polypropylene containing at least one of the carboxyl group or the carbonyl group. The resin different from the polypropylene may contain at least one of a carboxyl group, a carbonyl group, or a hydroxyl group.

The thermoplastic resin may contain the polypropylene containing at least one of the carboxyl group or the carbonyl group, and another resin containing, as a functional group, at least one of elements N, O, F, S, Cl, Br, or I. Surfaces of the carbon fibers may contain at least one of the carboxyl group, the carbonyl group, or the hydroxyl group.

The said another resin may be epoxy resin or polypropylene.

The polypropylene may be block polypropylene.

A diameter of each of the carbon fibers preferably falls within a range from 5 µm to 11 µm.

The amount of the carbon fibers preferably falls within a range from 0.5 mass % to 5 mass %.

The average length of the carbon fibers preferably falls within a range from 0.5 mm to 10 mm.

The thermoplastic resin molding is preferably formed by injection molding.

A method of forming a thermoplastic resin molding according to the present invention includes preparing a molten material by kneading a first resin material containing carbon fibers and first thermoplastic resin, and a second resin material containing second thermoplastic resin; and injecting the molten material into a mold. An average length of the carbon fibers contained in the first resin material falls within a range from 0.5 mm to 15 mm. Surfaces of the carbon fibers contain at least one of a carboxyl group, a carbonyl group, a hydroxyl group, or a Cl group. The first thermoplastic resin is polypropylene containing at least one of a carboxyl group, a carbonyl group, or a hydroxyl group. The molten material contains the carbon fibers within a range from 0.4 mass % to 10 mass %.

This configuration improves the affinity between the surfaces of the carbon fibers and the polypropylene containing at least one of the carboxyl group, the carbonyl group, or the hydroxyl group. This enables even dispersion of the carbon fibers in the polypropylene to form a thermoplastic resin molding that exhibits high shielding performance regardless of the orientation of polarized electromagnetic waves incident on the resin molding.

The first thermoplastic resin may be the polypropylene containing at least one of the carboxyl group or the carbonyl group. The surfaces of the carbon fibers may contain at least one of the carboxyl group, the carbonyl group, and the hydroxyl group. The surfaces of the carbon fibers contained in the first resin material may be covered with third resin containing at least one of a carboxyl group, a carbonyl group, or a hydroxyl group.

The first thermoplastic resin may be the polypropylene containing at least one of a carboxyl group or a carbonyl group. The surfaces of the carbon fibers may be covered with third resin containing, as a functional group, at least one of elements N, O, F, S, Cl, Br, or I. The third resin is preferably epoxy resin or polypropylene.

The second thermoplastic resin may be polypropylene different from the first thermoplastic resin.

The second thermoplastic resin may be the same polypropylene as the first thermoplastic resin.

The polypropylene may be block polypropylene.

In the thermoplastic resin molding according to the present invention, since the affinity between the surfaces of the carbon fibers and the polypropylene is high, the carbon fibers in the polypropylene are evenly dispersed in various directions. As a result, the thermoplastic resin molding provides high electromagnetic wave shielding performance regardless of the orientation of the face of vibration of electromagnetic waves.

DESCRIPTION OF EMBODIMENTS

Before describing embodiments of the present invention, the background of the present invention will be described.

Safe and efficient movement of objects while avoiding collision against another object is always required. The "movement of objects" includes, for example, a walking person, moving parts and products in a manufacturing line of a factory, parts and products transferred between manufacturing steps in a factory, a passing vehicle, and other various occasions. Out of them, how to avoid traffic collision has been considered for a long time.

For example, without noticing a vehicle approaching from behind, a driver would be hit by the vehicle due to erroneous handle or brake operation. To address this problem, there has been a study on sensing a following vehicle with a sensor (what is called a "monitoring radar") utilizing electromagnetic waves. In this case, the sensor needs to selectively sense only electromagnetic waves that are reflected by a following vehicle. Otherwise, the sensor could receive alert due to electromagnetic wave noise, or become unable to sensor the electromagnetic waves from the following vehicle that are buried in the noise. These situations are rather dangerous.

Electromagnetic waves to be transmitted are radiated with a certain spread, and thus reflected by vehicle components around a transmitter to reach a receiver, thereby causing noise. Placement of an electromagnetic wave shielding member around the receiver has been considered to shield unnecessary radio waves other than electromagnetic waves toward the following vehicle.

Since the location of a monitoring radar is limited, the electromagnetic wave shielding member usually has a complex shape. In addition, the electromagnetic wave shielding member needs to be light and mechanically strong, exhibit high electromagnetic wave shielding performance, and be manufactured at low costs. For example, a metal plate provides sufficiently high electromagnetic wave shielding performance, but is heavy and unsuitable for a complex shape. Such a metal plate also requires rustproof measures. Referring to Patent Document 1, the present inventors performed various studies to meet the requirements described above and reduce differences in electromagnetic wave shielding performance caused by the orientation of the face of vibration of electromagnetic waves, and arrived at the present invention.

Embodiments of the present invention will now be described with reference to the drawings. For simplification, the same reference characters are used in the drawings to represent elements having substantially the same functions.

First Embodiment

The present inventors studied to obtain desired electromagnetic wave shielding performance in using a resin molding containing carbon fibers for an electromagnetic wave shielding member. Specifically, the present inventors studied on the shielding performance of a resin plate with a thickness of 3.0 mm using horizontally polarized electromagnetic waves of 24 GHz as a monitoring radar. Even if the electromagnetic waves were incident vertically on the resin plate, and the face of the polarized electromagnetic waves is arbitrarily rotated in the forward direction, the studied resin molding always had an attenuation of 11 dB or more, which is equal to the electromagnetic wave shielding performance of the resin plate applied with a conductive material. Polypropylene was used as the thermoplastic resin in view of costs and mechanical characteristics.

Carbon fibers as a conductive material are dispersed in a resin molding. When high frequency electromagnetic waves of a monitoring radar, for example, are incident on the resin molding, a current flows through the carbon fibers due to an electromagnetic induction effect. If this current is an Eddy current, the Eddy current generates the lines of magnetic force opposite to the electromagnetic waves to cancel the electromagnetic waves and exhibit a shielding function. In order to generate the Eddy current, the carbon fibers themselves need to contact each other to cause a loop of a conductive material with a diameter equal to or less than half the wavelength of the electromagnetic waves. Electromagnetic waves of 24 GHz have a wavelength of about 1 cm.

If the carbon fiber content increases, the adjacent carbon fibers contact each other in the resin molding. If thermoplastic resin contains a large amount of carbon fibers, the carbon fibers contact each other sufficiently to cause a loop of the conductive material with a diameter being equal to or less than half the wavelength of the electromagnetic waves. However, an increasing carbon fiber content raises costs, degrades the flowing performance of the thermoplastic resin, and increasingly wears a cylinder of a kneading machine or a mold. Furthermore, reduction in the length of the carbon fibers in the thermoplastic resin leads to insufficient contact between the adjacent carbon fibers unless the carbon fiber content is increased. The carbon fibers in the thermoplastic resin become shorter in kneading and in passing through a passage during injection.

The present inventors studied these points, and found that the attenuation varies depending on the direction of vibration of electromagnetic waves. This is considered because carbon fibers tend to align along resin flow in injection molding. Actually, the attenuation of electromagnetic waves is large if the face of vibration is oriented horizontally to resin flow, and the smallest if the face is oriented vertically. However, the minimum attenuation needs to be 11 dB or more. There is thus a need to increase the carbon fiber content if the attenuation largely varies depending on the orientation of the face of vibration. After various studies, the present inventors found that a combination of certain surface processing of carbon fibers and certain modification of thermoplastic resin reduces the variations in the attenuation due to the orientation of face of vibration, and the carbon fiber content. A thermoplastic resin molding according to this embodiment will now be described.

Method of Manufacturing Resin Molding

A method of manufacturing a resin molding is as follows.

As raw materials, masterbatch (i.e., a first resin material) and pellets for dilution (i.e., a second resin material) are mixed, and put into a kneading extruder. The masterbatch is first thermoplastic resin containing a large amount of carbon fibers. The pellets are made of second thermoplastic resin The kneading extruder is, for example, a twin screw extruder, which melt-kneads the masterbatch and the pellets for dilution to evenly disperse the carbon fibers in the thermoplastic resin.

Next, the melt-kneaded molten material is injected into the mold, and cooled to form a resin molding. The resin molding is a member for attaching an electromagnetic wave transceiver of a monitoring radar, and includes shielding portions at its top, sides, and bottom.

Evaluation of Electromagnetic Wave Shielding Performance of Resin Molding

Figure 1:
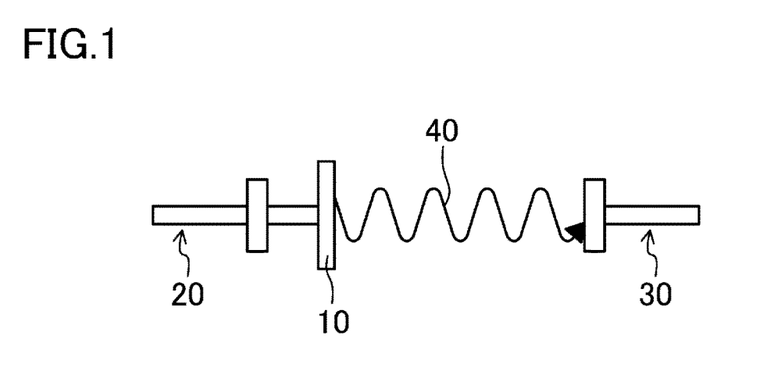
FIG. 1 is a schematic view of an evaluator of electromagnetic wave shielding performance.

With use of an evaluator shown in FIG. 1, the electromagnetic wave shielding performance of a resin molding was evaluated. The evaluator includes probe antennas for transmitting and receiving radio waves. A transmission antenna 20 is disposed at a distance of 12 mm from a reception antenna 30, which is formed by exposing a flange of a detector. A resin molding sample 10 is disposed to face the transmission antenna 20. An electromagnetic wave 40 to be transmitted and received is a horizontally polarized wave with a frequency of 24.2 GHz. The resin molding sample 10 was evaluated at two positions such that the molten material flows horizontally and vertically to the face of vibration of electromagnetic waves.

Example

As masterbatch containing carbon fibers, a chip obtained by adding carbon fibers to block polypropylene modified with maleic anhydride was used. The carbon fibers had a diameter of 5-7 µm and a length of 8 mm. The surfaces of the carbon fibers were oxidized to introduce a carboxyl group and a hydroxyl group. This masterbatch contains thermoplastic resin and the carbon fibers at a mass ratio of 6:4. It was confirmed by measuring absorption of light with a wavelength in the infrared spectrum by FT-IR that the modified block polypropylene contained a carbonyl group. Existence of the carboxyl and hydroxyl groups on the surfaces of the carbon fibers was confirmed by XPS.

Next, a diluent material was prepared by mixing native block polypropylene, ethylene/α-olefin copolymer elastomer, and talc (with an average particle size of 4 µm) at a mass ratio of 60:15:25. The masterbatch and this diluent material were mixed at a predetermined mass ratio and put into a raw material hopper of an injection molding apparatus. The mixture is then injected into a mold (in a size of 360 mm×250 mm×3 mm) having a single point direct gate. As a result, a resin molding sample was fabricated. The thickness of the resin molding was 3.0 mm. The molding conditions were as follows. The temperature of the resin was 240° C. The temperature of the mold was 60° C. The speed of the screw was 80 rpm (the screw was a double flight screw). The back pressure was 10 MPa. The injection speed was 40 mm/s. The pressure was kept at 40 MPa×4 sec.

Figure 2:
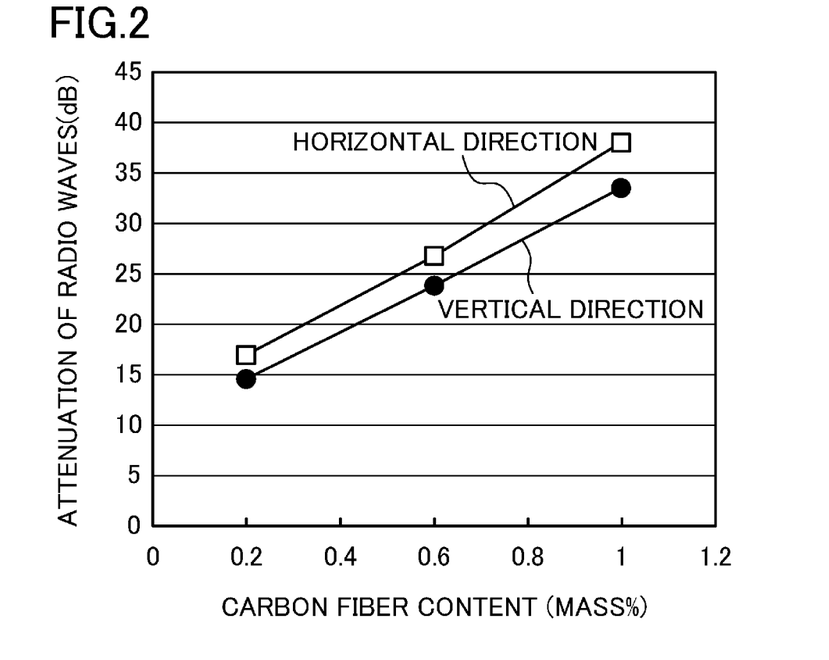
FIG. 2 illustrates the relationship between a carbon fiber content and attenuation of radio waves according to an embodiment.

FIG. 2 illustrates a result of evaluating electromagnetic wave shielding performance while changing the amount of carbon fibers contained in a resin molding sample. At this time, the carbon fibers were broken by injection molding and became shorter. As a result of measuring distribution of the lengths of the carbon fibers by image analysis, the average length of the carbon fibers in the resin molding sample was longer than 0.5 mm. The attenuation of radio waves was the maximum when the resin molding sample was placed such that the molten material flowed horizontally to the face of vibration of electromagnetic waves. The attenuation was the minimum when the resin molding sample was placed such that the molten material flowed vertically. At other angles, the attenuation fell between the minimum and the maximum.

When the carbon fiber content was 0.2 mass %, the attenuation of the radio waves was 14.5 dB or higher. Even after the direction of flow of the molten material in the sample was changed with respect to the face of vibration of the electromagnetic waves, the attenuation of the radio waves varied only by 2.5 dB. This attenuation of the radio waves and the amount of change represent sufficient electromagnetic wave shielding performance for a product. With an increase in the carbon fiber content up to 1 mass %, the attenuation of the radio waves increased, but the variation range of the attenuation of the radio waves caused by a change in the orientation of the sample was as small as 2.5-4.5 dB. The attenuation of the radio waves when the carbon fiber content is lower than 0.2 mass % is estimated by extrapolating the graph of FIG. 2. It is clear that the electromagnetic wave shielding performance of 11 dB needed for a product is obtained by setting the carbon fiber content to 0.1 mass % or more. In view of the reliability of data, carbon fibers of 0.2 mass % or more are preferably added. In view of differences in the electromagnetic wave shielding performance depending on differences in raw materials and manufacturing steps or on the position of the product, the attenuation of the radio waves is preferably 20 dB or higher. This electromagnetic wave shielding performance is obtained by a carbon fiber content of 0.45 mass % or more.

Figure 3:
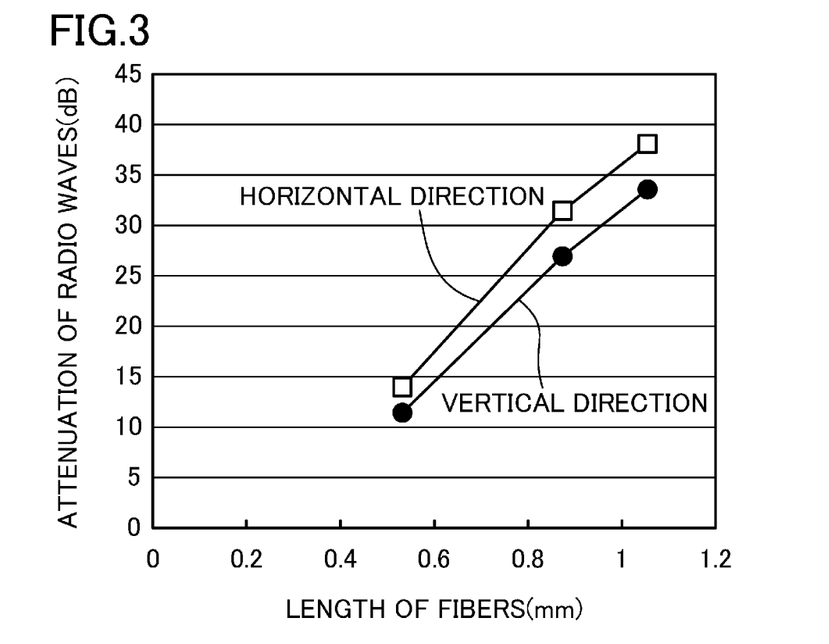
FIG. 3 illustrates the relationship between the average length of carbon fibers and attenuation of radio waves according to an embodiment.

Next, FIG. 3 illustrates how electromagnetic wave shielding performance differs depending on the average length of carbon fibers in a resin molding sample. In an injection molding apparatus, an increase in the degree of kneading is considered to increase the degree of breaking to reduce the lengths of carbon fibers. Thus, a plurality of resin molding samples containing carbon fibers at 1 mass % were fabricated at different degrees of kneading, and the average length of the carbon fibers was measured.

As shown in FIG. 3, within the range from 0.53 mm to 1.06 mm, the average length of the carbon fibers was almost proportional to the attenuation of radio waves, and the variation range of the attenuation of the radio waves caused by a change in the orientation of the sample was 2.5-4.6 dB. When the average length of the carbon fibers was 0.5 mm, the attenuation of the radio waves was 11.4 dB or higher, thereby obtaining sufficient electromagnetic wave shielding performance for a product. The average length of the carbon fibers depends on the lengths of the carbon fibers contained in the masterbatch, the kneading conditions, the shape of the mold, and other factors. The upper limit of the average length for providing excellent electromagnetic wave shielding performance is 15 mm.

Comparative Example

A resin molding sample according to a comparative example was fabricated as follows. As masterbatch containing carbon fibers, a chip obtained by adding carbon fibers to native block polypropylene was used. The carbon fibers had a diameter of 5-7 μm and a length of 8 mm. The surfaces of the carbon fibers were oxidized to introduce a carbonyl group. The same diluent material as in the example was used.

In the example and the comparative example, resin molding samples having a thickness of 1.5 mm and containing carbon fibers at 1 mass % were fabricated under the same injection conditions. The average length of the carbon fibers was 1.06 mm in the sample of the example, and 1.10 mm in the sample of the comparative example.

Figure 4:
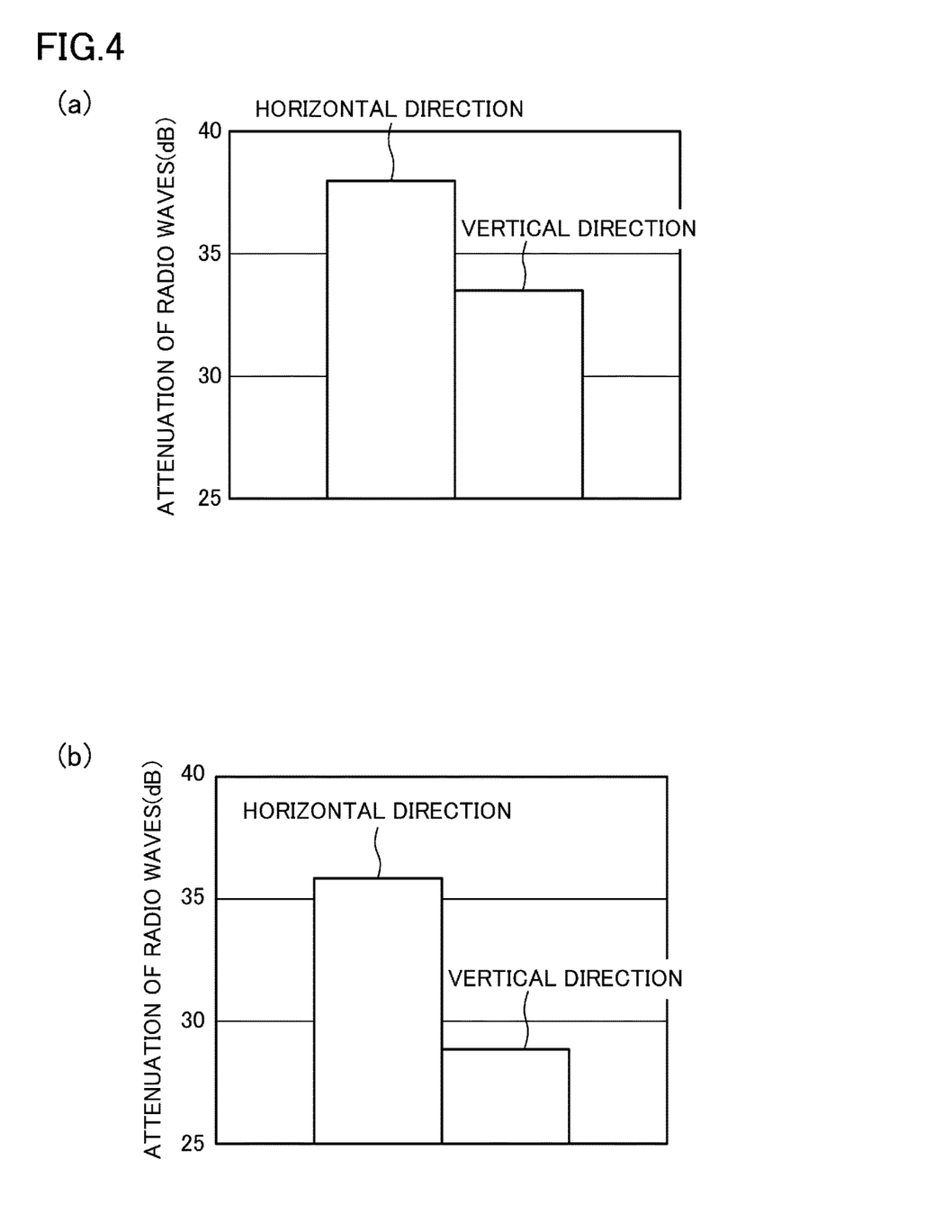
FIG. 4 illustrates comparison between an embodiment and a comparative example.

FIG. 4(a) illustrates the electromagnetic wave shielding performance of the example. FIG. 4(b) illustrates the electromagnetic wave shielding performance of the comparative example. In the comparative example, when the resin molding sample was placed such that a molten material flowed horizontally to the face of vibration of electromagnetic waves, the attenuation of the radio waves was as high as 36 dB. When the sample was placed such that the molten material flowed vertically, the attenuation was 28 dB. That is, depending on the orientation of the sample, the attenuation of the radio waves largely varies. On the other hand, in the example, even if the orientation of the sample changes, the attenuation of the radio waves falls within a range from 33 dB to 38 dB. The example provides such significant attenuation, which is varied little by a change in the orientation, and desired electromagnetic wave shielding performance regardless of the orientation.

In the comparative example, the thermoplastic resin is native block polypropylene and thus less wettable with the carbon fibers, thereby causing uneven dispersion of the carbon fibers in the thermoplastic resin molding. Therefore, the orientation of the sample largely varies the attenuation of the radio waves.

Second Embodiment

The second embodiment is different from the first embodiment in the types of functional groups contained in polypropylene being the first thermoplastic resin, the types of functional groups contained in the surfaces of the carbon fibers, and third resin coating the surfaces of the carbon fibers. The differences from the first embodiment will now be mainly described. The methods of manufacturing the resin molding and evaluating the electromagnetic wave shielding performance of the resin molding are the same as in the first embodiment, and the explanation thereof will be omitted.

Example

As masterbatch containing carbon fibers, a chip obtained by adding carbon fibers to block polypropylene modified with maleic anhydride was used. The carbon fibers had a diameter of 5-7 μm and a length of 8 mm. The surfaces of the carbon fibers were oxidized to introduce a carboxyl group and a carbonyl group and then, coated with epoxy resin (third resin) containing a Cl group. This masterbatch contains thermoplastic resin and the carbon fibers at a mass ratio of 6:4. It was confirmed by measuring absorption of light with a wavelength in the infrared spectrum by FT-IR that the modified block polypropylene contained a carbonyl group. Existence of the carboxyl and carbonyl groups, and the Cl group derived from the coated resin on the surfaces of the carbon fibers was confirmed by XPS.

Next, a diluent material was prepared by mixing native block polypropylene, ethylene/α-olefin copolymer elastomer, and talc (with an average particle size of 4 μm) at a mass ratio of 60:15:25. The masterbatch and this diluent material were mixed at a predetermined mass ratio and put into a raw material hopper of an injection molding apparatus. The mixture is then injected into a mold (in a size of 360 mm×250 mm×3 mm) having a single point direct gate. As a result, a resin molding sample was fabricated. The thickness of the resin molding was 3.0 mm. The molding conditions were as follows. The temperature of the resin was 240° C. The temperature of the mold was 60° C. The speed of the screw was 80 rpm (the screw was a double flight screw). The back pressure was 10 MPa. The injection speed was 40 mm/s. The pressure was kept at 40 MPa×4 sec.

Figure 5:
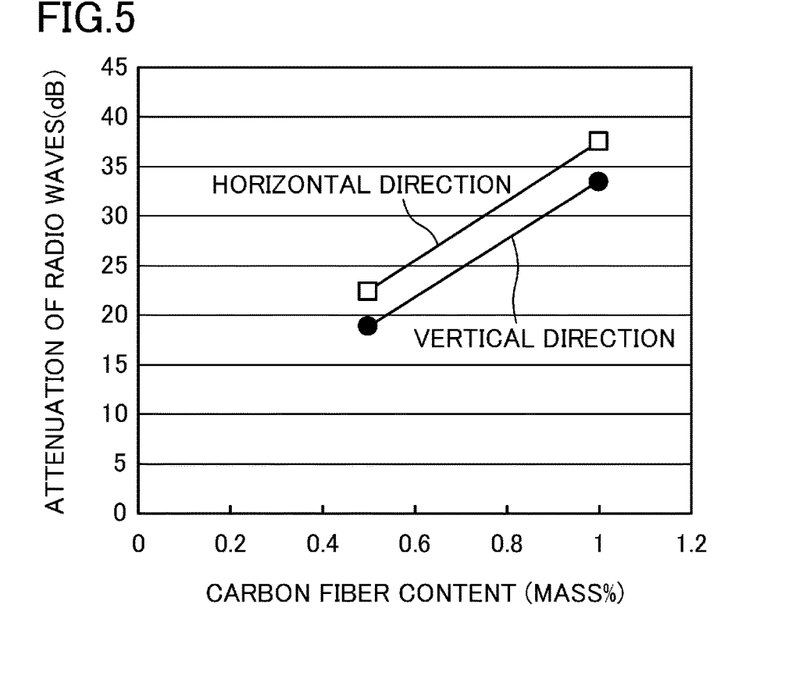
FIG. 5 illustrates the relationship between a carbon fiber content and attenuation of radio waves according to an embodiment.

FIG. 5 illustrates a result of evaluating electromagnetic wave shielding performance while changing the amount of carbon fibers contained in a resin molding sample. At this time, the carbon fibers were broken by injection molding and became shorter. As a result of measuring distribution of the lengths of the carbon fibers by image analysis, the average length of the carbon fibers in the resin molding sample was longer than 0.5 mm. The attenuation of radio waves was the maximum when the resin molding sample was placed such that the molten material flowed horizontally to the face of vibration of the electromagnetic waves. The attenuation was the minimum when the resin molding sample was placed such that the molten material flowed vertically. At other angles, the attenuation fell between the minimum and the maximum.

When the carbon fiber content was 0.5 mass %, the attenuation of the radio waves was 18 dB or higher. Even after the direction of flow of the molten material in the sample was changed with respect to the face of vibration of the electromagnetic waves, the attenuation of the radio waves varied only by 4 dB. This attenuation of the radio waves and the amount of change represent sufficient electromagnetic wave shielding performance for a product. With an increase in the carbon fiber content up to 1 mass %, the attenuation of the radio waves increased, but the variation range of the attenuation of the radio waves caused by a change in the orientation of the sample was as small as 3.5-4 dB. The attenuation of the radio waves when the carbon fiber content is lower than 0.5 mass % is estimated by extrapolating the graph of FIG. 5. It is clear that the electromagnetic wave shielding performance of 11 dB needed for a product is obtained by setting the carbon fiber content to 0.25 mass % or more. In view of the reliability of data, carbon fibers of 0.4 mass % or more are preferably added. In view of differences in the electromagnetic wave shielding performance depending on differences in raw materials and manufacturing steps or on the position of the product, the attenuation of the radio waves is preferably 20 dB or higher. This electromagnetic wave shielding performance is obtained by carbon fibers of 0.55 mass % or more.

Figure 6:
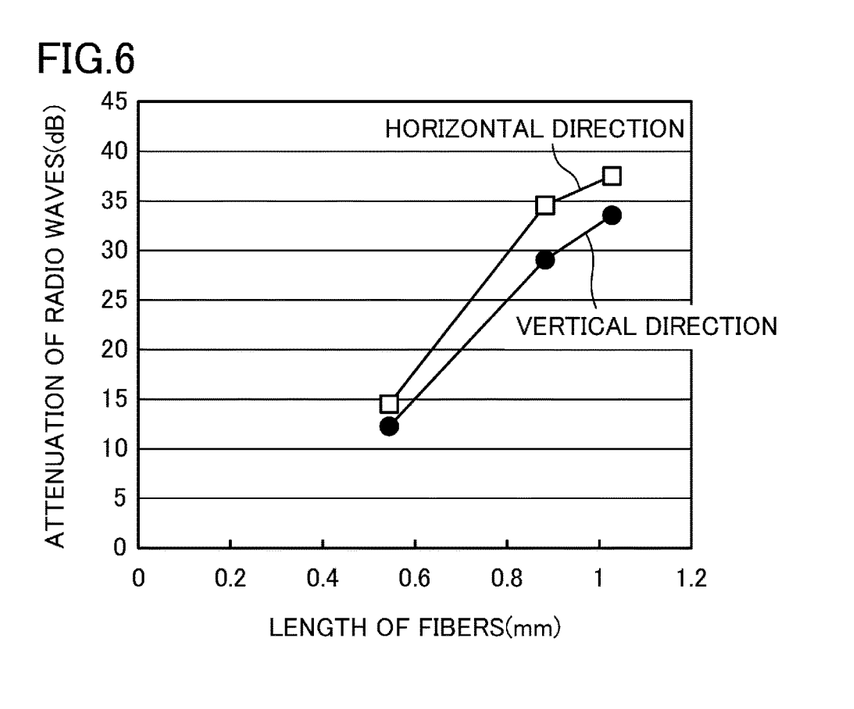
FIG. 6 illustrates the relationship between the average length of carbon fibers and attenuation of radio waves according to an embodiment.

Next, FIG. 6 illustrates how electromagnetic wave shielding performance differs depending on the average length of carbon fibers in a resin molding sample. In an injection molding apparatus, an increase in the degree of kneading is considered to increase the degree of breaking to reduce the lengths of carbon fibers. Thus, a plurality of resin molding samples containing carbon fibers at 1 mass % were fabricated at different degrees of kneading, and the average length of the carbon fibers was measured.

As shown in FIG. 6, within the range from 0.54 mm to 1.03 mm, the average length of the carbon fibers was almost proportional to the attenuation of radio waves, and the variation range of the attenuation of the radio waves caused by a change in the orientation of the sample was 2.3-5.5 dB. When the average length of the carbon fibers was 0.5 mm, the attenuation of the radio waves was 12.2 dB or higher, thereby obtaining sufficient electromagnetic wave shielding performance for a product. The average length of the carbon fibers depends on the lengths of the carbon fibers contained in the masterbatch, the kneading conditions, the shape of the mold, and other factors. The upper limit of the average length for providing excellent electromagnetic wave shielding performance is 15 mm.

Comparative Example

A resin molding sample according to a comparative example was fabricated as follows. As masterbatch containing carbon fibers, a chip obtained by adding carbon fibers to native block polypropylene was used. The carbon fibers had a diameter of 5-7 μm and a length of 8 mm. The surfaces of the carbon fibers were oxidized to introduce a carbonyl group. The surfaces of the carbon fibers were not coated with resin. The same diluent material as in the example was used.

In the example and the comparative example, resin molding samples having a thickness of 1.5 mm and containing carbon fibers at 1 mass % were fabricated under the same injection conditions. The average length of the carbon fibers was 1.03 mm in the sample of the example, and 1.10 mm in the sample of the comparative example.

Figure 7:
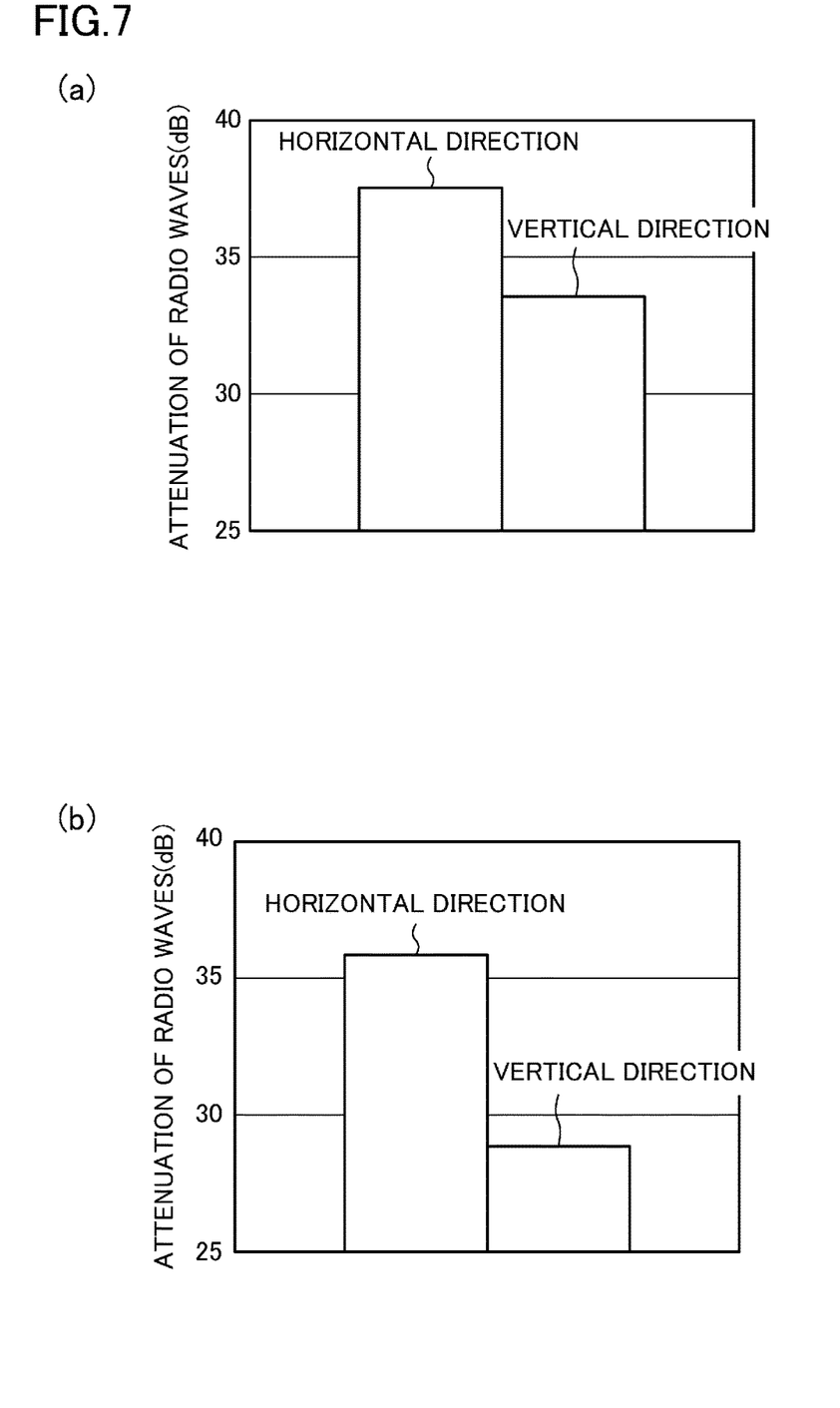
FIG. 7 illustrates comparison between an embodiment and a comparative example.

FIG. 7(a) illustrates the electromagnetic wave shielding performance of the example. FIG. 7(b) illustrates the electromagnetic wave shielding performance of the comparative example. In the comparative example, when the resin molding sample was placed such that a molten material flowed horizontally to the face of vibration of electromagnetic waves, the attenuation of the radio waves was as high as 36 dB. When the sample was placed such that the molten material flowed vertically, the attenuation was 28 dB. That is, depending on the orientation of the sample, the attenuation of the radio waves largely varies. On the other hand, in the example, even if the orientation of the sample changes, the attenuation of the radio wave falls within a range from 33 dB to 38 dB. The example provides such significant attenuation, which is varied little by a change in the orientation, and desired electromagnetic wave shielding performance regardless of the orientation.

Third Embodiment

The third embodiment is different from the first embodiment in the types of functional groups contained in the surfaces of the carbon fibers. The differences from the first embodiment will now be mainly described. The method of manufacturing the resin molding and evaluating the electromagnetic wave shielding performance of the resin molding is the same as in the first embodiment, and the explanation thereof will be omitted.

Example

As a master chip containing carbon fibers, a chip obtained by adding carbon fibers to block polypropylene modified with maleic anhydride was used. The carbon fibers had a diameter of 5-7 μm and a length of 8 mm. The surfaces of the carbon fibers were subjected to chlorine processing to introduce a Cl group. This master chip contains thermoplastic resin and the carbon fibers at a mass ratio of 6:4. It was confirmed by measuring absorption of light with a wavelength in the infrared spectrum by FT-IR that the modified block polypropylene contained a carbonyl group. Existence of the Cl group on the surfaces of the carbon fibers was confirmed by XPS.

Next, a diluent material was prepared by mixing native block polypropylene, ethylene/α-olefin copolymer elastomer, and talc (with an average particle size of 4 μm) at a mass ratio of 60:15:25. The master chip and this diluent material were mixed at a predetermined mass ratio and put into a raw material hopper of an injection molding apparatus. The mixture is then injected into a mold (in a size of 360 mm×250 mm×3 mm) having a single point direct gate. As a result, a resin molding sample was fabricated. The thickness of the resin molding was 3.0 mm. The molding conditions were as follows. The temperature of the resin was 240° C. The temperature of the mold was 60° C. The speed of the screw was 80 rpm (the screw was a double flight screw). The back pressure was 10 MPa. The injection speed was 40 mm/s. The pressure was kept at 40 MPa×4 sec.

Figure 8:
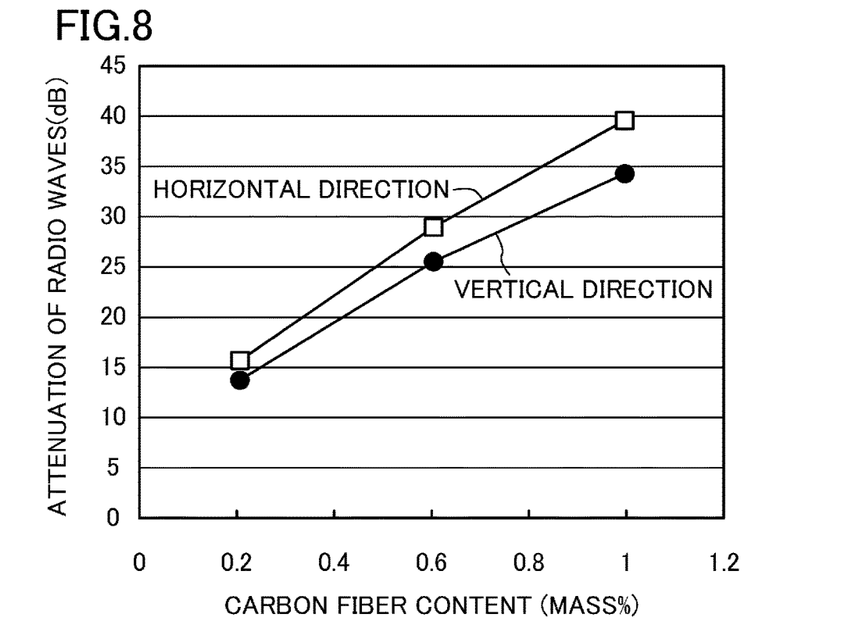
FIG. 8 illustrates the relationship between a carbon fiber content and attenuation of radio waves according to an embodiment.

FIG. 8 illustrates a result of evaluating electromagnetic wave shielding performance while changing the amount of carbon fibers contained in a resin molding sample. At this time, the carbon fibers were broken by injection molding and became shorter. As a result of measuring distribution of the lengths of the carbon fibers by image analysis, the average length of the carbon fibers in the resin molding sample was longer than 0.5 mm. The attenuation of radio waves was the maximum when the resin molding sample was placed such that the molten material flowed horizontally to the face of vibration of the electromagnetic waves. The attenuation was the minimum when the resin molding sample was placed such that the molten material flowed vertically. At other angles, the attenuation fell between the minimum and the maximum.

When the carbon fiber content was 0.2 mass %, the attenuation of the radio waves was 13.8 dB or higher. Even after the direction of flow of the molten material in the sample was changed with respect to the face of vibration of the electromagnetic waves, the attenuation of the radio waves varied only by 1.7 dB. This attenuation of the radio waves and the amount of change represent sufficient electromagnetic wave shielding performance for a product. With an increase in the carbon fiber content up to 1 mass %, the attenuation of the radio waves increased, but the variation range of the attenuation of the radio waves caused by a change in the orientation of the sample was as small as 1.7-5.3 dB. The attenuation of the radio waves when the carbon fiber content is lower than 0.2 mass % is estimated by extrapolating the graph of FIG. 8. It is clear that the electromagnetic wave shielding performance of 11 dB needed for a product is obtained by setting the carbon fiber content to 0.1 mass % or more. In view of the reliability of data, carbon fibers of 0.2 mass % or more are preferably added. In view of differences in the electromagnetic wave shielding performance depending on differences in raw materials and manufacturing steps or on the position of the product, the attenuation of the radio waves is preferably 20 dB or higher. This electromagnetic wave shielding performance is obtained by carbon fibers of 0.4 mass % or more.

Figure 9:
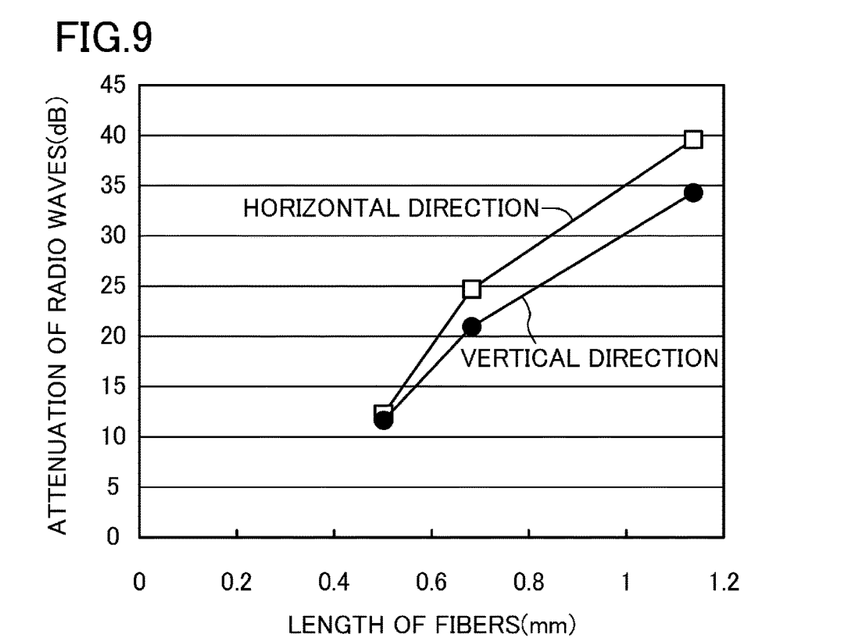
FIG. 9 illustrates the relationship between the average length of carbon fibers and attenuation of radio waves according to an embodiment.

Next, FIG. 9 illustrates how electromagnetic wave shielding performance differs depending on the average length of carbon fibers in a resin molding sample. In an injection molding apparatus, an increase in the degree of kneading is considered to increase the degree of breaking to reduce the lengths of carbon fibers. Thus, a plurality of resin molding samples containing carbon fibers at 1 mass % were fabricated at different degrees of kneading, and the average length of the carbon fibers was measured.

As shown in FIG. 9, within the range from 0.50 mm to 1.14 mm, the average length of the carbon fibers was proportional to the attenuation of radio waves, and the variation range of the attenuation of the radio waves caused by a change in the orientation of the sample was 0.9-5.3 dB. When the average length of the carbon fibers was 0.5 mm, the attenuation of the radio waves was 11.5 dB or higher, thereby obtaining sufficient electromagnetic wave shielding performance for a product. The average length of the carbon fibers depends on the lengths of the carbon fibers contained in the master chip, the kneading conditions, the shape of the mold, and other factors. The upper limit of the average length for providing excellent electromagnetic wave shielding performance is 15 mm.

Comparative Example

A resin molding sample according to a comparative example was fabricated as follows. As a master chip containing carbon fibers, a chip obtained by adding carbon fibers to native block polypropylene was used. The carbon fibers had a diameter of 5-7 μm and a length of 8 mm. The surfaces of the carbon fibers were oxidized to introduce a carbonyl group. The same diluent material as in the example was used.

In the example and the comparative example, resin molding samples having a thickness of 1.5 mm and containing carbon fibers at 1 mass % were fabricated under the same injection conditions. The average length of the carbon fibers was 1.14 mm in the sample of the example, and 1.10 mm in the sample of the comparative example.

Figure 10:
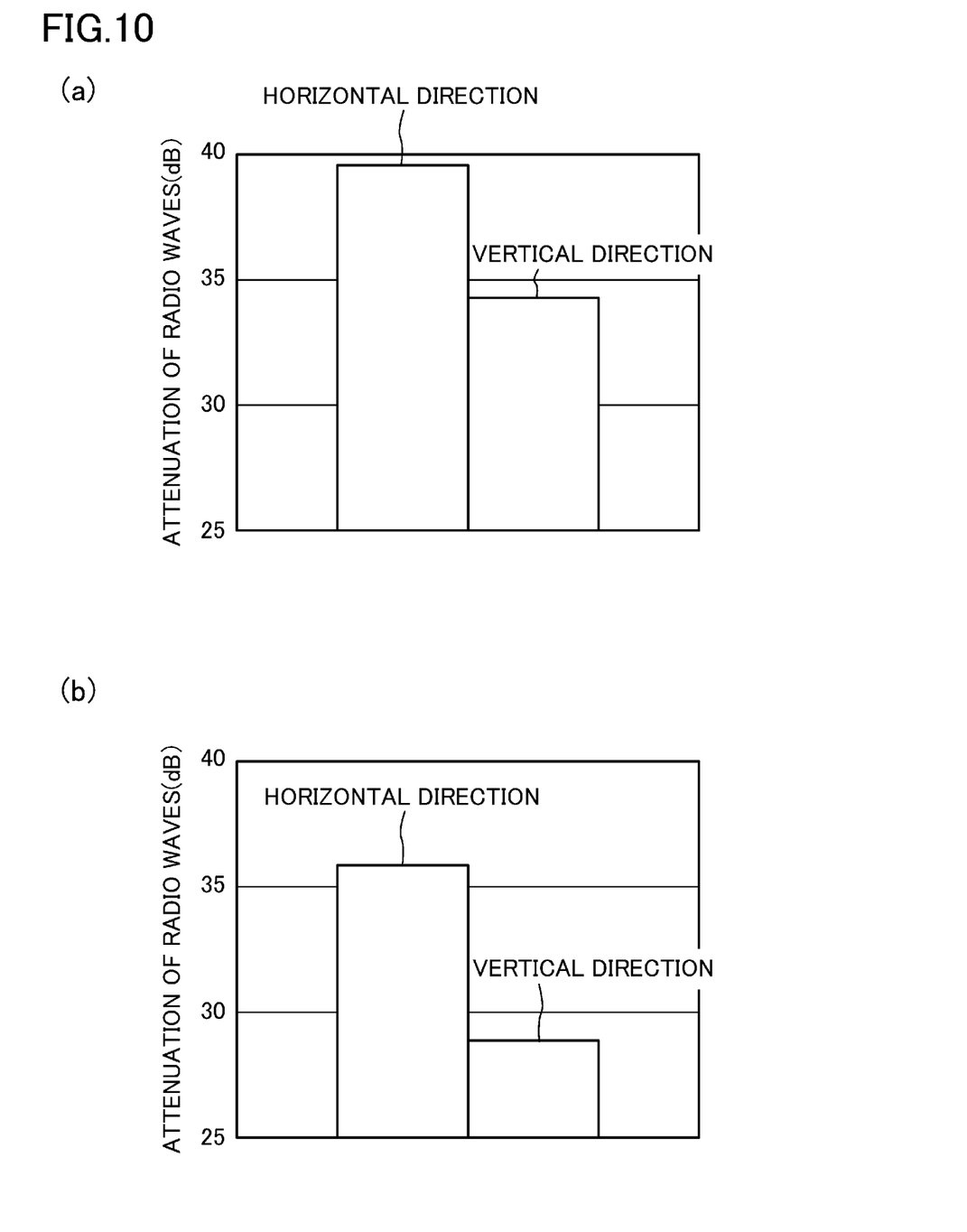
FIG. 10 illustrates comparison between an embodiment and a comparative example.

FIG. 10(a) illustrates the electromagnetic wave shielding performance of the example. FIG. 10(b) illustrates the electromagnetic wave shielding performance of the comparative example. In the comparative example, when the resin molding sample was placed such that a molten material flowed horizontally to the face of vibration of electromagnetic waves, the attenuation of the radio waves was as high as 36 dB. When the sample was placed such that the molten material flowed vertically, the attenuation was 28 dB. That is, depending on the orientation of the sample, the attenuation of the radio waves largely varies. On the other hand, in the example, even if the orientation of the sample changes, the attenuation of the radio wave falls within a range from 34 dB to 39 dB. The example provides desired electromagnetic wave shielding performance regardless of the orientation, and attenuation varied little by a change in the orientation.

Other Embodiments

The embodiments described above are mere examples of the present invention. The present invention is not limited to these examples. These examples may be combined or partially replaced with known, publicly known, or conventional art. The present invention also includes modifications easily conceived by those skilled in the art.

In the embodiments described above, the resin molding is manufactured by injection molding. The resin molding may be manufactured by press molding. Unlike the injection molding, press molding does not break carbon fibers, which have thus an average length up to 15 mm. The surfaces of carbon fibers may contain a carbonyl group. It suffices that the surfaces contain at least one of a carboxyl group, a carbonyl group, a hydroxyl group, or a Cl group. It suffices that the modified polypropylene used in the masterbatch contains at least one of a carboxyl group, a carbonyl group, and a hydroxyl group. However, the modified polypropylene may contain a plurality of these groups.

The thermoplastic resin molding according to the present invention is applicable not only to vehicle parts but also to any other member such as a case of an electronic device or a robot body, which needs to shield electromagnetic waves.

The thermoplastic resin molding according to the present invention may contain filler, an additive, elastomer, and other objects in addition to the carbon fibers. The polypropylene in the pellets containing the carbon fibers may be one type or a blend of a plurality of types. It suffices that at least one of the plurality of types includes at least one of a carboxyl group, a carbonyl group, or a hydroxyl group. The polypropylene for dilution may also be one type or a blend of a plurality of types. The polypropylene for dilution (i.e., the second thermoplastic resin) may be the same as the polypropylene of the masterbatch (i.e., the first thermoplastic resin).

The polypropylene contained in the thermoplastic resin molding of the present invention is not limited to block polypropylene, and may be a homopolymer or a random copolymer with ethylene.

The resin (i.e., the third resin) coating the surfaces of the carbon fibers may be resin other than epoxy resin, for example, phenolic resin or polypropylene. This phenolic resin or polypropylene contains, as a functional group, at least one of elements N, O, F, S, Cl, Br, or I.

INDUSTRIAL APPLICABILITY

As described above, the thermoplastic resin molding according to the present invention exhibits excellent electromagnetic wave shielding performance, and is useful as an electromagnetic wave shielding member, for example.

DESCRIPTION OF REFERENCE CHARACTERS

10 Resin Molding Sample
20 Transmission Antenna
30 Reception Antenna
40 Electromagnetic Wave

The invention claimed is:

1. A thermoplastic resin molding containing at least one of thermoplastic resins and carbon fibers, wherein
an amount of the carbon fibers is 0.4 mass % or more but less than 1 mass %,
an average length of the carbon fibers falls within a range from 0.5 mm to 15 mm,
said at least one of the thermoplastic resins is polypropylene,
the polypropylene includes polypropylene containing at least one of a carboxyl group, a carbonyl group, or a hydroxyl group, and
surfaces of the carbon fibers contain a hydroxyl group.

2. The thermoplastic resin molding of claim 1, wherein said at least one of the thermoplastic resins contain the polypropylene containing at least one of the carboxyl group or the carbonyl group.

3. The thermoplastic resin molding of claim 2, wherein said at least one of the thermoplastic resins contain resin different from the polypropylene containing at least one of the carboxyl group or the carbonyl group, and
the resin different from the polypropylene contains at least one of a carboxyl group, a carbonyl group, or a hydroxyl group.

4. The thermoplastic resin molding of claim 1, wherein said at least one of the thermoplastic resins contain
the polypropylene containing at least one of the carboxyl group or the carbonyl group, and
another resin containing, as a functional group, at least one of elements N, O, F, S, Cl, Br, or I.

5. The thermoplastic resin molding of claim 4, wherein said another resin is epoxy resin or polypropylene.

6. The thermoplastic resin molding of claim 1, wherein the polypropylene being the thermoplastic resin is block polypropylene.

7. The thermoplastic resin molding of claim 1, wherein a diameter of each of the carbon fibers falls within a range from 5 μm to 11 μm.

8. The thermoplastic resin molding of claim 1, wherein the amount of the carbon fibers is 0.5 mass % or more but less than 1 mass %.

9. The thermoplastic resin molding of claim 1, wherein the average length of the carbon fibers falls within a range from 0.5 mm to 10 mm.

10. The thermoplastic resin molding of claim 1, wherein the thermoplastic resin molding is formed by injection molding.

11. A method of forming a thermoplastic resin molding, the method comprising:
preparing a molten material by kneading a first resin material containing carbon fibers and first thermoplastic resin, and a second resin material containing second thermoplastic resin; and
injecting the molten material into a mold, wherein an average length of the carbon fibers contained in the first resin material falls within a range from 0.5 mm to 15 mm,
surfaces of the carbon fibers contain a hydroxyl group,
the first thermoplastic resin is polypropylene containing at least one of a carboxyl group, a carbonyl group, or a hydroxyl group, and
the molten material contains the carbon fibers of 0.4 mass % or more but less than 1 mass %.

12. The method of claim 11, wherein
the first thermoplastic resin is the polypropylene containing at least one of the carboxyl group or the carbonyl group.

13. The method of claim 12, wherein
the surfaces of the carbon fibers contained in the first resin material are covered with third resin containing at least one of a carboxyl group, a carbonyl group, or a hydroxyl group.

14. The method of claim 11, wherein
the first thermoplastic resin is the polypropylene containing at least one of the carboxyl group or the carbonyl group, and
the surfaces of the carbon fibers are covered with third resin containing, as a functional group, at least one of elements N, O, F, S, Cl, Br, or I.

15. The method of claim 11, wherein the second thermoplastic resin is polypropylene different from the first thermoplastic resin.

16. The method of claim 11, wherein the second thermoplastic resin is the same polypropylene as the first thermoplastic resin.

17. The method of claim 14, wherein the third resin is epoxy resin or polypropylene.

18. The method of claim 11, wherein the polypropylene being the first and/or the second thermoplastic resin is block polypropylene.

\* \* \* \* \*